(12) United States Patent
Kobayashi et al.

(10) Patent No.: US 11,077,739 B2
(45) Date of Patent: Aug. 3, 2021

(54) VEHICULAR AIR CONDITIONING UNIT

(71) Applicant: DENSO CORPORATION, Kariya (JP)

(72) Inventors: Ryo Kobayashi, Kariya (JP); Yoshihiko Okumura, Kariya (JP); Yasuhiro Sekito, Kariya (JP); Shinya Kato, Kariya (JP)

(73) Assignee: DENSO CORPORATION, Kariya (JP)

(*) Notice: Subject to any disclaimer, the term of this patent is extended or adjusted under 35 U.S.C. 154(b) by 201 days.

(21) Appl. No.: 16/251,159

(22) Filed: Jan. 18, 2019

(65) Prior Publication Data

US 2019/0152299 A1 May 23, 2019

Related U.S. Application Data

(63) Continuation of application No. PCT/JP2017/020246, filed on May 31, 2017.

(30) Foreign Application Priority Data

Jul. 22, 2016 (JP) .............................. JP2016-144484

(51) Int. Cl.
*B60H 1/32* (2006.01)
*B60H 1/00* (2006.01)

(52) U.S. Cl.
CPC ....... *B60H 1/3233* (2013.01); *B60H 1/00028* (2013.01); *B60H 1/00064* (2013.01); *B60H 1/00514* (2013.01); *B60H 1/32* (2013.01); *B60H 1/3227* (2013.01)

(58) Field of Classification Search
CPC ............ B60H 1/00028; B60H 1/00064; B60H 1/00514; B60H 1/32; B60H 1/3227; B60H 1/3233
See application file for complete search history.

(56) References Cited

U.S. PATENT DOCUMENTS 6,478,083 B1 * 11/2002 Nanba ................ B60H 1/00514
165/202
6,994,157 B1 * 2/2006 Arold ................. B60H 1/00064
165/203

(Continued)

FOREIGN PATENT DOCUMENTS

JP S53019936 U 2/1978
JP H03032514 U 3/1991

(Continued)

*Primary Examiner* — Filip Zec
(74) *Attorney, Agent, or Firm* — Harness, Dickey & Pierce, P.L.C.

(57) ABSTRACT

In a vehicular air conditioning unit, an air conditioning case includes a space forming portion that forms a drainage space which is partitioned from an air passage. The space forming portion includes a drainage portion that discharges water from inside the air conditioning case to outside of the air conditioning case. Further, the space forming portion includes an upstream side communication portion that communicates the drainage space to an upstream side space on an air flow upstream side of the blower in the air passage. Further, the space forming portion includes a downstream side communication portion that communicates the drainage space to a downstream side space on the air flow downstream side of the blower in the air passage.

4 Claims, 8 Drawing Sheets

(56) References Cited

U.S. PATENT DOCUMENTS

| | | | |
|---|---|---|---|
| 7,407,001 B2* | 8/2008 | Newman | B60H 1/00028 |
| | | | 165/202 |
| 9,174,511 B2* | 11/2015 | Seto | B60H 1/00678 |
| 9,683,774 B2* | 6/2017 | Kanemaru | B60H 1/005 |
| 2004/0093885 A1* | 5/2004 | Ito | B60H 1/00028 |
| | | | 62/244 |
| 2009/0025905 A1 | 1/2009 | Tokunaga et al. | |
| 2018/0093551 A1 | 4/2018 | Maeda | |

FOREIGN PATENT DOCUMENTS

| | | |
|---|---|---|
| JP | 2001180255 A | 7/2001 |
| JP | 2009023590 A | 2/2009 |
| WO | WO-2016170878 A1 | 10/2016 |

\* cited by examiner

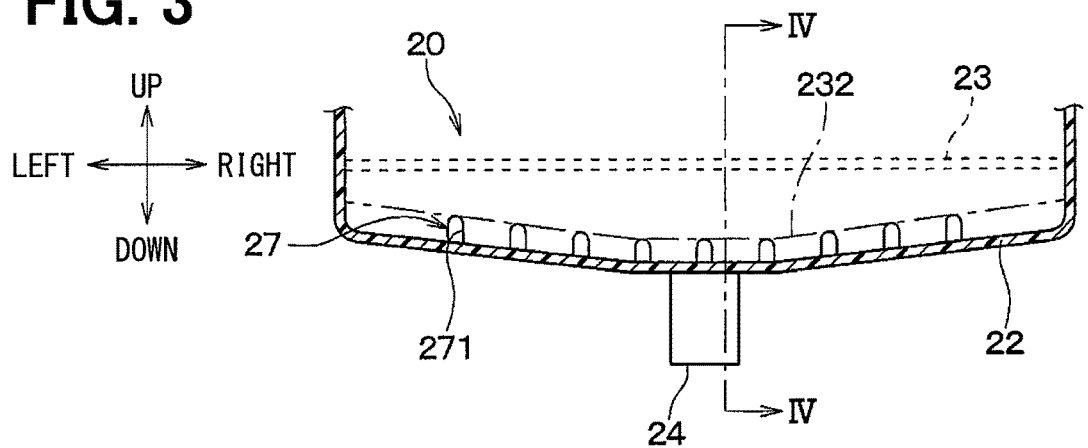
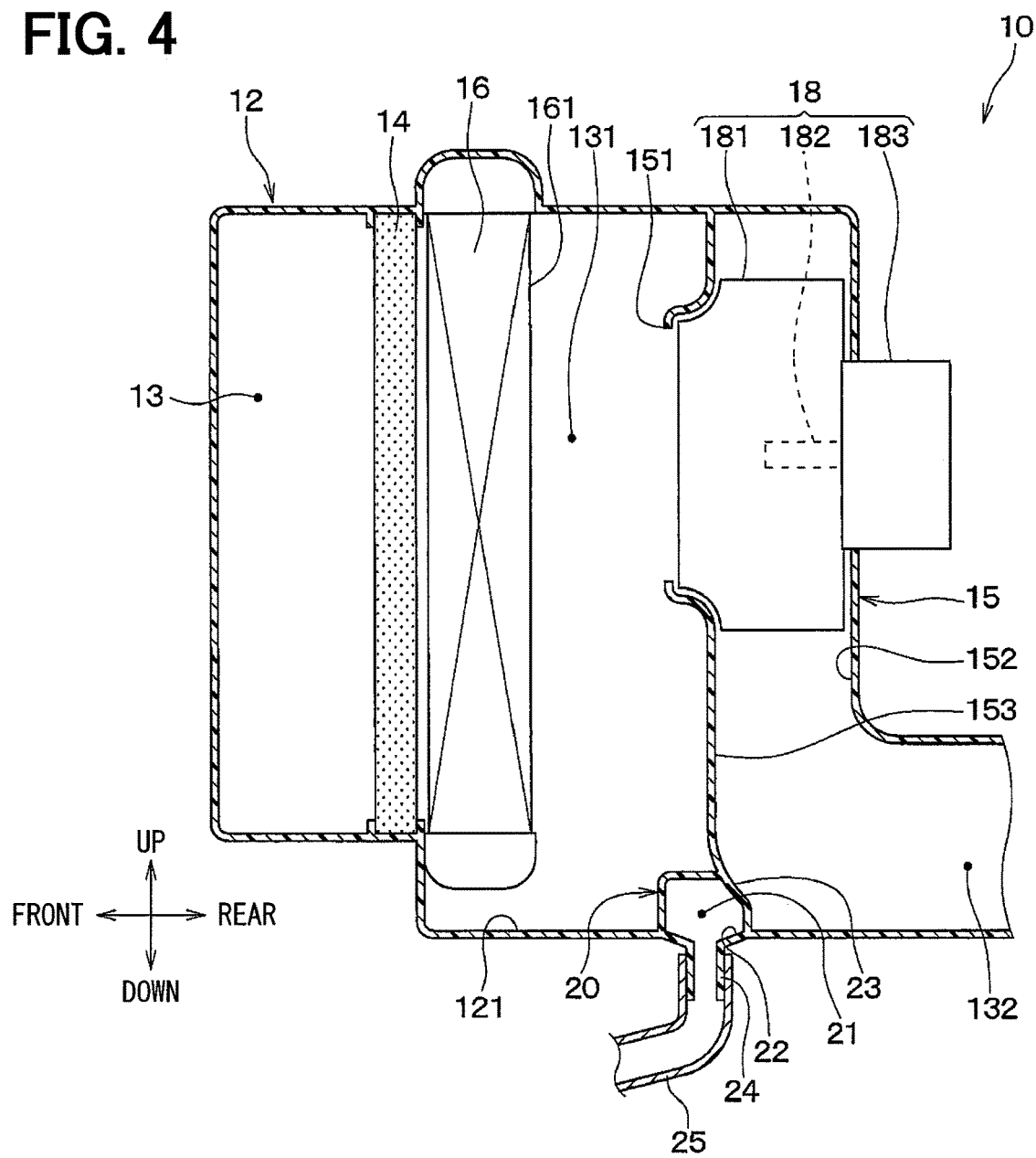

VEHICULAR AIR CONDITIONING UNIT

CROSS REFERENCE TO RELATED APPLICATIONS

The present application is a continuation application of International Patent Application No. PCT/JP2017/020246 filed on May 31, 2017, which designated the United States and claims the benefit of priority from Japanese Patent Application No. 2016-144484 filed on Jul. 22, 2016.

TECHNICAL FIELD

The present disclosure relates to a vehicular air conditioning unit that air conditions a passenger compartment.

BACKGROUND

A vehicular air conditioning unit may adjust a mixing ratio of air cooled by an evaporator and air heated by a heater core to adjust a temperature of air blown into a passenger compartment of a vehicle.

SUMMARY

According to one aspect of the present disclosure, a vehicular air conditioner may include an air conditioning case that forms an air passage for ventilation air toward the passenger compartment, a heat exchanger housed inside the air conditioning case, the heat exchanger exchanging heat between a fluid flowing therein and the ventilation air, and a blower disposed on an air flow downstream side of the heat exchanger, the blower generating an air flow that flows toward the passenger compartment.

The air conditioning case may include a space forming portion that forms a drainage space which is partitioned from the air passage.

The space forming portion may include a drainage portion that discharges water from inside the air conditioning case to outside of the air conditioning case and an upstream side communication portion that communicates the drainage space to an upstream side space on an air flow upstream side of the blower in the air passage. The space forming portion may further include a downstream side communication portion that communicates the drainage space to a downstream side space on the air flow downstream side of the blower in the air passage.

BRIEF DESCRIPTION OF DRAWINGS

FIG. 3 is a cross-sectional view taken along line III-III in FIG. 1.

FIG. 4 is a cross-sectional view taken along line IV-IV of FIG. 3.

DETAILED DESCRIPTION

Hereinafter, embodiments of the present disclosure will be described with reference to the drawings. In the following embodiments, parts, which are the same as or equivalent to those described in the preceding embodiment(s), will be indicated by the same reference signs, and the description thereof may be omitted. Also, in the following embodiments, when only some of the constituent elements are described, corresponding constituent elements of a previously described one or more of the embodiments may be applied to the rest of the constituent elements. The following embodiments may be partially combined with each other even if such a combination is not explicitly described as long as there is no disadvantage with respect to such a combination.

First Embodiment

The present embodiment will be described with reference to FIGS. 1 to 7. The arrows indicating up and down, right and left, front and rear in each figure indicate the up-down direction, the left-right direction, and the front-rear direction in a state of being mounted to a vehicle.

Figure 1:
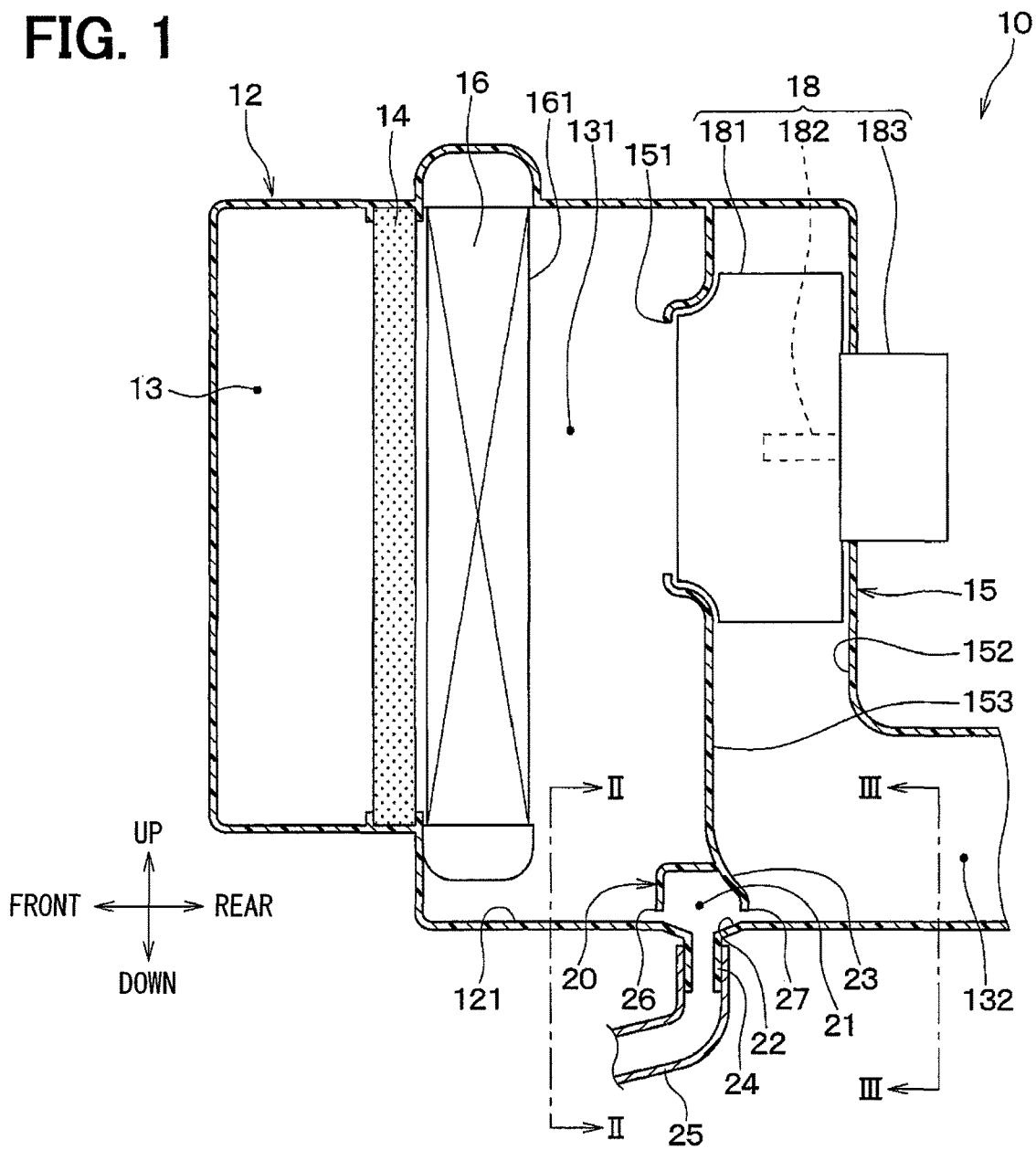
FIG. 1 is a cross-sectional view schematically illustrating a vehicular air conditioning unit.

A vehicular air conditioning unit 10 shown in FIG. 1 is arranged inside an instrument panel positioned in a front area of a passenger compartment. As shown in FIG. 1, the vehicular air conditioning unit 10 includes an air conditioning case 12, an inside/outside air door (not shown), an evaporator 16, a blower 18, a heater core (not shown), an air mix door (not shown), and the like.

The air conditioning case 12 forms an outer shell of the vehicular air conditioning unit 10, and also forms an air passage 13 through which ventilation air, which is to be blown into the passenger compartment, flows. The air conditioning case 12 is formed of a resin (for example, polypropylene) having some degree of elasticity and excellent in strength. The air conditioning case 12 is actually assembled from a plurality of separate casing sections for reasons such as for ease of resin molding or for ease of assembling internal components. Specifically, the casing sections are fastened to each other by fastener members such as screws or clips to form the air conditioning case 12.

Although not shown, the air conditioning case 12 is provided with an outside air introducing portion for introducing air from outside of the passenger compartment (that is, outside air) and an inside air introducing portion for introducing air from inside the passenger compartment (that is, inside air). The outside air introducing portion and the inside air introducing portion are formed adjacent to each other in the air conditioning case 12 on the air flow upstream side of the blower 18. Further, although not shown, the inside/outside air door which adjust the opening ratio between the outside air introduction portion and the inside air introduction portion is arranged inside the air conditioning case 12.

Although not shown, a defroster opening portion, a face opening portion, and a foot opening portion are formed in the air conditioning case 12 on the air flow downstream side of the blower 18. The defroster opening portion is an opening portion for supplying air toward the inside of window glass in the vehicle. The face opening portion is an opening portion for supplying air toward the upper body side of a passenger in the passenger compartment. The foot opening portion is an opening portion for supplying air toward the lower body side of a passenger in the passenger compartment. Further, although not shown, blowout mode doors which adjust the opening/closing state of each of the above-described openings are provided inside the air conditioning case 12.

The air conditioning case 12 is provided with an air filter 14 which collects foreign matter such as dust contained in the air introduced from the outside air introduction portion or inside air introduction portion. The air filter 14 includes a filter frame, a filter element, etc. (not shown).

An evaporator 16 is accommodated In the air conditioning case 12. The evaporator 16 functions as a cooling heat exchanger that cools the air flowing therein. The evaporator 16 is disposed on the air flow downstream side of the air filter 14 so that air passes through the air filter 14 and then passes through the evaporator 16.

In the present embodiment, the evaporator 16 is a low-pressure side heat exchanger of a vapor-compression refrigeration circuit. That is, the evaporator 16 is a heat exchanger that cools the air flowing in the air conditioning case 12 by exchanging heat between a low-temperature, low-pressure fluid (e.g., refrigerant) flowing in the evaporator 16 and the air to evaporate the fluid. The evaporator 16 has a thin shape with a rectangular outer shape. Further, the evaporator 16 includes a heat exchanging portion that exchanges heat between the refrigerant and the air. In the present embodiment, a thickness direction of the heat exchanging portion is in the front-rear direction.

In the air conditioning case 12, the blower 18, which generates an airflow that blows into the passenger compartment, is disposed. The blower 18 is arranged on the air flow downstream side of the evaporator 16 inside the air conditioning case 12. The blower 18 includes a fan 181 and an electric motor 183 that drives a rotating shaft 182 connected to the fan 181 to rotate the rotating shaft 182. In the present embodiment, the blower 18 is arranged so that an axial direction of the rotating shaft 182 is along the thickness direction of the evaporator 16.

The fan 181 is configured to draw in air along the axial direction of the rotating shaft 182 and to blow out the air along a direction that intersects the axial direction of the rotating shaft 182. In the present embodiment, the fan 181 is a centrifugal fan characterized in that dynamic pressure is small and static pressure is large as compared to an axial fan. Specifically, the centrifugal fan draws air along the axial direction of the rotating shaft 182 and blows the air radially outward along the radial direction of the rotating shaft.

The centrifugal fan can be classified as a sirocco fan, a radial fan, or a turbofan depending on the shapes of the blades. In the present embodiment, the fan 181 is a turbofan having the highest static pressure among the sirocco fan, the radial fan, and the turbofan. It should be noted that the centrifugal fan may a sirocco fan or a radial fan instead of a turbo fan as well.

In the air conditioning case 12, a fan accommodating portion 15 is formed to accommodate the fan 181. The fan accommodating portion 15 is formed on the air flow downstream side of the evaporator 16 in the air conditioning case 12.

An air intake portion 151 for guiding air to the interior of the fan 181 is provided in the fan accommodating portion 15 at a position located on one end side in the axial direction of the rotating shaft 182. Further, an air blowout portion 152 for blowing out the air flow generated inside the fan 181 is provided in the fan accommodating portion 15 at a position outward in the radial direction of the rotating shaft 182.

The fan accommodating portion 15 of the present embodiment includes a partitioning wall portion 153 that partitions the air passage 13 into an upstream side space 131 and a downstream side space 132. The upstream side space 131 is on the air flow upstream side of the blower 18 and the downstream side space 132 is on the air flow downstream side of the blower 18.

In the present embodiment, the blower 18 is arranged so that the air intake portion 151 faces an air outflow surface 161 of the evaporator 16 such that the air is easily guided to the air intake portion 151 after passing through the evaporator 16. In other words, the evaporator 16 of the present embodiment is disposed in a state in which the air outflow surface 161 faces the air intake portion 151 so as to be visible from the air intake portion 151.

The heater core (not shown) is disposed in the air conditioning case 12 on the air flow downstream side of the air blowout portion 152. The heater core serves as the heating heat exchanger and is configured to heat the air that passed through the evaporator 16. As the heater core, for example, a heat exchanger that uses cooling water which cools an internal combustion engine as a heat source to heat the air that passed through the evaporator 16 can be used.

In addition, a cold air bypass passage (not shown) is formed in the air conditioning case 12 on the downstream side of the air blowout portion 152. The cold air bypass passage is a passage that allows the air blown out from the blower 18 to flow while bypassing the heater core.

Further, in the air conditioning case 12, the air mix door is arranged. The air mix door is a member for adjusting the air volume ratio between the air passing through the heater core and the air passing through the cold air bypass passage. Further, in the air conditioning case 12, the defroster opening portion, the face opening portion, and the foot opening portion are formed on the air flow downstream side of the heater core and the cool air bypass passage.

The air conditioning case 12 is provided with a space forming portion 20 that forms a drainage space 21 which is partitioned from the air passage 13 through which air flows. The drainage space 21 is a space for discharging water inside the air conditioning case 12 to outside of the air conditioning case 12.

The space forming portion 20 is provided between the upstream side space 131 on the air flow upstream side of the blower 18 in the air passage 13 and the downstream side space 132 on the air flow downstream side of the blower 18 in the air passage 13. Specifically, the space forming portion 20 is provided at a position on the lower side of the partitioning wall portion 153 in the fan accommodating portion 15. Further, the space forming portion 20 is adjacent to a lower wall surface 121 of the air conditioning case 12.

The space forming portion 20 has a lower wall forming portion 22 constituting a part of the lower wall surface 121 of the air conditioning case 12, and a partitioning portion 23 that partitions the upstream side space 131 and the downstream side space 132. The drainage space 21 is formed between the lower wall forming portion 22 and the partitioning portion 23.

The lower wall forming portion 22 is formed integrally with the lower wall surface 121 of the air conditioning case 12. Further, the lower wall forming portion 22 is not necessarily formed integrally with the lower wall surface 121 of the air conditioning case 12, but may be formed as a member different from the air conditioning case 12 instead.

The lower wall forming portion 22 is formed with a drainage portion 24 which drains the water inside the air conditioning case 12 to outside of the air conditioning case 12. The lower wall forming portion 22 is inclined such that the part of the lower wall forming portion 22 where the drainage portion 24 is provided is positioned lower in the up-down direction as compared to the other parts of the lower wall forming portion 22. As a result, the lower wall forming portion 22 collects any water that drips toward the lower wall surface 121 of the air conditioning case 12 into the drainage portion 24.

The drainage portion 24 is formed as a pipe-shaped portion protruding downward from the lower wall forming portion 22. A drain hose 25 for guiding the water inside the air conditioning case 12 to outside the passenger compartment is connected to the drainage portion 24.

The partitioning portion 23 of the space forming portion 20 is formed integrally with the partitioning wall portion 153 of the fan accommodating portion 15 of the air conditioning case 12. Further, the partitioning portion 23 may be formed as a member different from the partitioning wall portion 153 instead of being formed integrally with the partitioning wall portion 153 as well.

An upstream side communication portion 26 is formed in the partitioning portion 23. The upstream side communication portion 26 communicates the upstream side space 131 on the air flow upstream side of the blower 18 in the air passage 13 with the drainage space 21. The upstream side communication portion 26 is formed at a portion of the partitioning portion 23 that faces the upstream side space 131.

Figure 2:
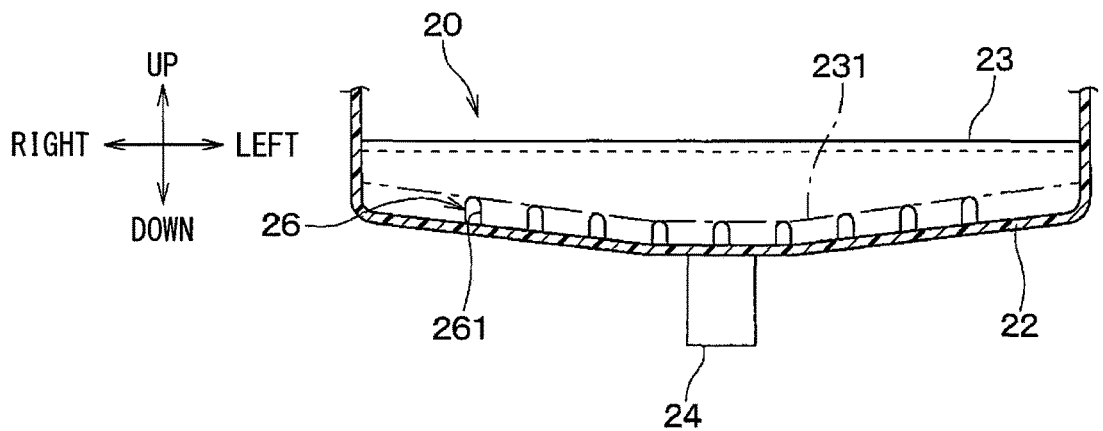
FIG. 2 is a cross-sectional view taken along line II-II in FIG. 1.

At least a part of the upstream side communication portion 26 of the present embodiment is formed to overlap with a first connection portion 231 of the partitioning portion 23 which is connected to the lower wall forming portion 22. Specifically, as shown in FIG. 2, the upstream side communication portion 26 of the present embodiment is a plurality of communication holes 261 formed in the partitioning portion 23 at positions adjacent to the lower wall forming portion 22. The plurality of communication holes 261 are formed by vertically elongated holes formed side by side along the left-right direction. It should be noted that the communication holes 261 may be horizontally elongated holes instead as well.

Returning to FIG. 1, a downstream side communication portion 27 is formed in the partitioning portion 23 of the space forming portion 20. The downstream side communication portion 27 communicates the downstream side space 132 on the air flow downstream side of the blower 18 in the air passage 13 with the drainage space 21. The downstream side communication portion 27 of the present embodiment is formed at a portion of the partitioning portion 23 that faces the downstream side space 132.

At least a part of the downstream side communication portion 27 of the present embodiment is formed to overlap with a second connection portion 232 of the partitioning portion 23 which is connected to the lower wall forming portion 22. Specifically, as shown in FIG. 3, the downstream side communication portion 27 of the present embodiment is a plurality of communication holes 271 formed in the partitioning portion 23 at positions adjacent to the lower wall forming portion 22. The plurality of communication holes 271 are formed by vertically elongated holes formed side by side along the left-right direction. It should be noted that the communication holes 271 may be horizontally elongated holes instead as well.

Here, when the air conditioning case 12 of the present embodiment is viewed at a cross section taken at a position avoiding the upstream side communication portion 26 and the downstream side communication portion 27, as shown in FIG. 4, the drainage space 21 is formed in a substantially rectangular shape by the lower wall forming portion 22 and the partitioning portion 23. It should be noted that the connection portions 231 and 232 of the partitioning portion 23 connected to the lower wall forming portion 22 are lower side portions of the partitioning portion 23 that intersect the lower wall forming portion 22.

Here, in the present embodiment, as shown in FIGS. 2 and 3, an example is illustrated in which the upstream side communication portion 26 and the downstream side communication portion 27 are formed by the communication holes 261 and 271 having the same number of holes and having the same shape as each other, but the present embodiment is not limited to this. The pressure state of the drainage space 21 changes according to the numbers and shapes of the communication holes 261 and 271 of the upstream side communication portion 26 and the downstream side communication portion 27. The numbers and shapes of the communication holes 261 and 271 of the upstream side communication portion 26 and the downstream side communication portion 27 may be appropriately modified such that the pressure state of the drainage space 21 reaches a desired pressure state.

Next, the operation of the vehicular air conditioning unit 10 of the present embodiment will be described with reference to FIG. 5. When the fan 181 of the blower 18 is rotationally driven by the electric motor 183, the vehicular air conditioning unit 10 generates an air current in the air conditioning case 12 which flows toward the interior of the passenger compartment, as shown in FIG. 5.

Figure 5:
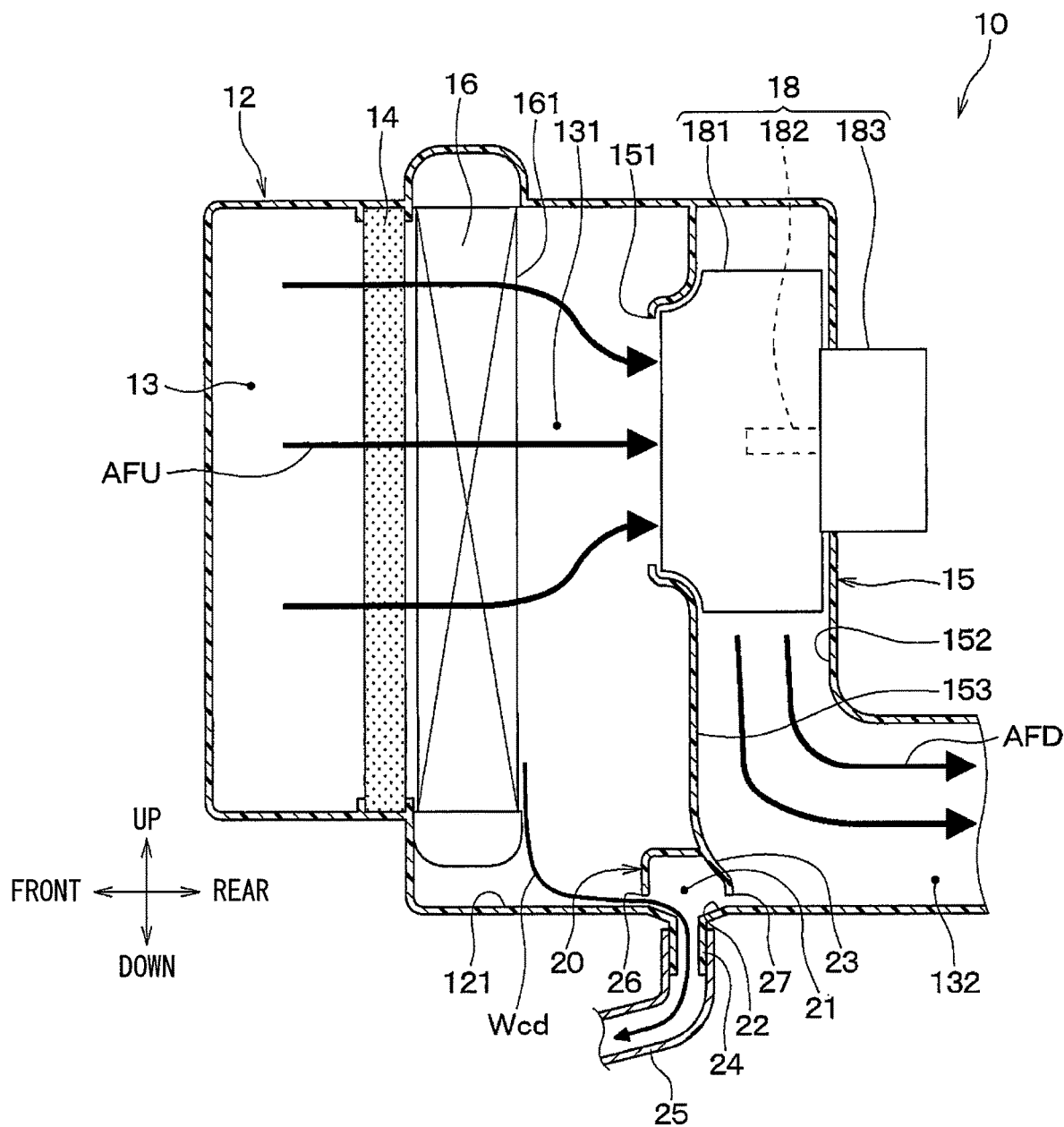
FIG. 5 is a cross-sectional view schematically illustrating a vehicular air conditioning unit.

Specifically, in the upstream side space 131 in the air passage 13, as indicated by the arrow AFU in FIG. 5, the airflow introduced from the outside air introduction portion or the inside air introduction portion flows into the evaporator 16 via the air filter 14. After being cooled to a particular temperature by the evaporator 16, this air flow is sucked into the fan 181 from the air intake portion 151.

The air sucked into the fan 181 is then blown out from the inside of the fan 181 toward the radially outer side of the fan 181 as indicated by the arrow AFD in FIG. 5. This airflow flows through the downstream side space 132 in the air passage 13. In the downstream side space 132, after passing through the heater core or the cold air bypass passage, which are not illustrated, the air is blown out into the passenger compartment through any of the various openings.

Next, the flow of water in the vehicular air conditioning unit 10 of the present embodiment will be described. In the vehicular air conditioning unit 10 of the present embodiment, moisture contained in the air condenses when the air flowing through the upstream side space 131 is cooled by the evaporator 16. As indicated by the arrow Wcd in FIG. 5, the condensed water flows downward along the air outflow surface 161 of the evaporator 16 and drips down to the lower wall surface 121 which forms the upstream side space 131. The condensed water dripping onto the lower wall surface 121 of the air conditioning case 12 flows through the upstream side communication portion 26 into the drainage space 21 and is discharged to outside of the passenger compartment via the drainage portion 24 and the drain hose 25.

Here, a portion of the condensed water may be sucked into the fan 181 together with the air cooled by the evaporator 16. This condensed water is blown out to the radially outer side of the fan 181 together with the air, and enters the downstream side space 132. The condensed water that entered the downstream side space 132 then flows through the downstream side communication portion 27 into the drainage space 21 and is discharged to outside of the passenger compartment via the drainage portion 24 and the drain hose 25.

Here, the drainage space 21 of the present embodiment is in communication with both the upstream side space 131 on the air flow upstream side of the blower 18 and the downstream side space 132 on the air flow downstream side of the blower 18. For this reason, the pressure inside the drainage space 21 is an intermediate pressure between the pressure in the upstream side space 131 and the pressure in the downstream side space 132. That is, in the vehicular air conditioning unit 10 of the present embodiment, the pressure difference between the drainage space 21 and the outside of the air conditioning case 12 is lower than both the pressure difference between the upstream side space 131 and the outside of the air conditioning case 12 and the pressure difference between the downstream side space 132 and the outside of the air conditioning case 12. For this reason, in the vehicular air conditioning unit 10 of the present embodiment, it is possible to suppress the occurrence of various troubles caused by the pressure difference between the space provided with the drainage portion 24 and the outside of the air conditioning case 12.

It should be noted that the vehicular air conditioning unit 10 of the present embodiment is a so-called suction type layout vehicular air conditioning unit, in which a blower for blowing air into the passenger compartment is disposed on the air flow downstream side of a heat exchanger such as an evaporator. Generally speaking, with such a structure, the pressure in the space in the air conditioning case where the drain hole is provided becomes lower than the pressure outside the air conditioning case. As a result, the air outside the air conditioning case tends to flow into the internal space of the air conditioning case via the drain hole. If the air outside the air conditioning case flows into the air conditioning case via the drain hole, abnormal noises may occur when draining water from the drain hole, or ventilation loss may increase due to sucking in air from outside the passenger compartment. On the other hand, it is conceivable to provide the drain hole on the air blowout side of the blower. Generally speaking, with such a structure, within the internal space of the air conditioning case, the pressure in the space where the drain hole is provided becomes higher than the pressure outside the air conditioning case. As a result, it is difficult for the air outside the air conditioning case to flow into the internal space of the air conditioning case via the drain hole. However, in the structure in which the drain hole is provided on the air blowout side of the blower, a part of the air whose temperature has been adjusted by the heat exchanger flows out of the air conditioning case via the drain hole, and so ventilation loss may increase.

Figure 6:
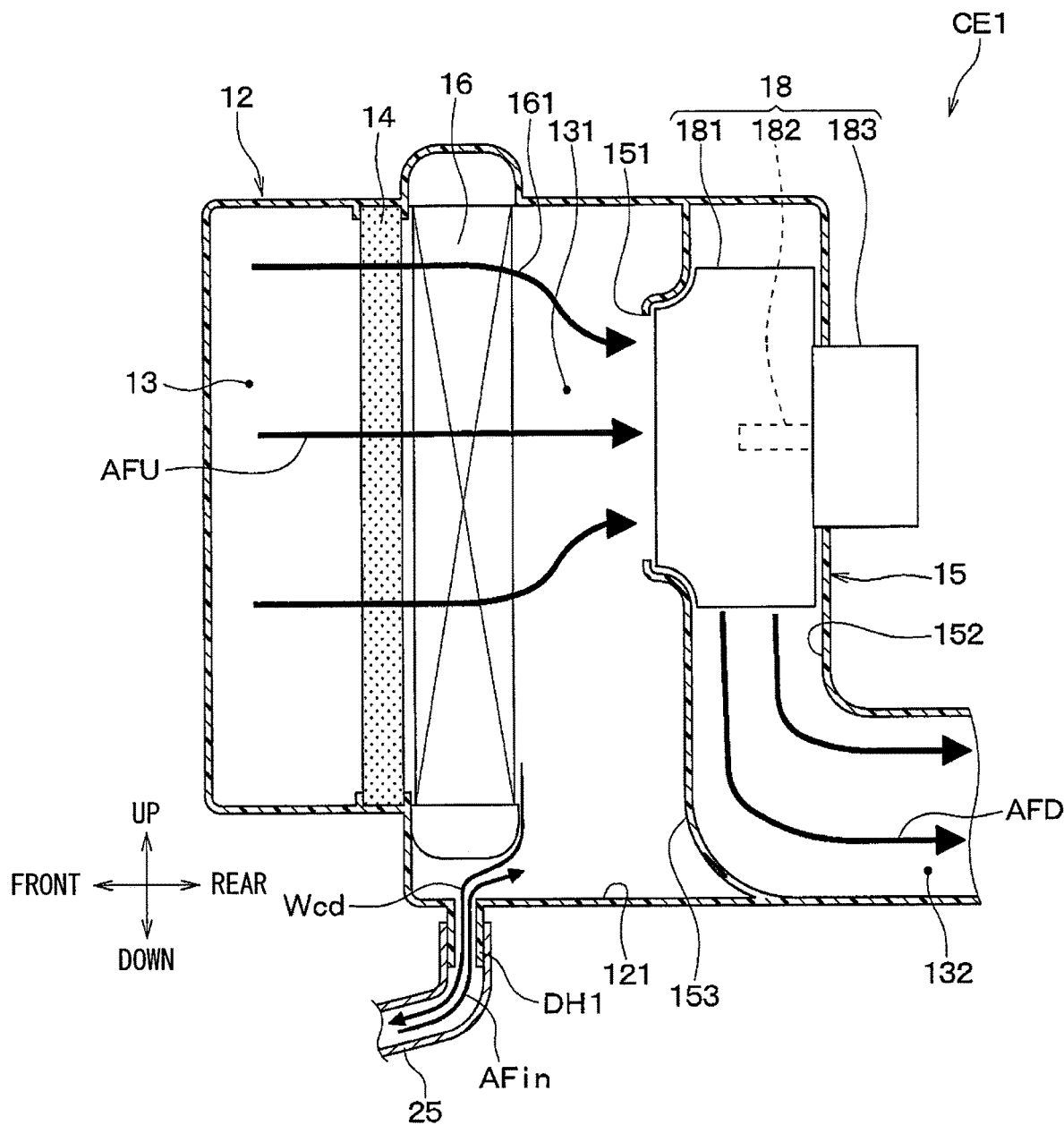
FIG. 6 is a cross-sectional view schematically illustrating a vehicular air conditioning unit according to a first comparative example.
Figure 7:
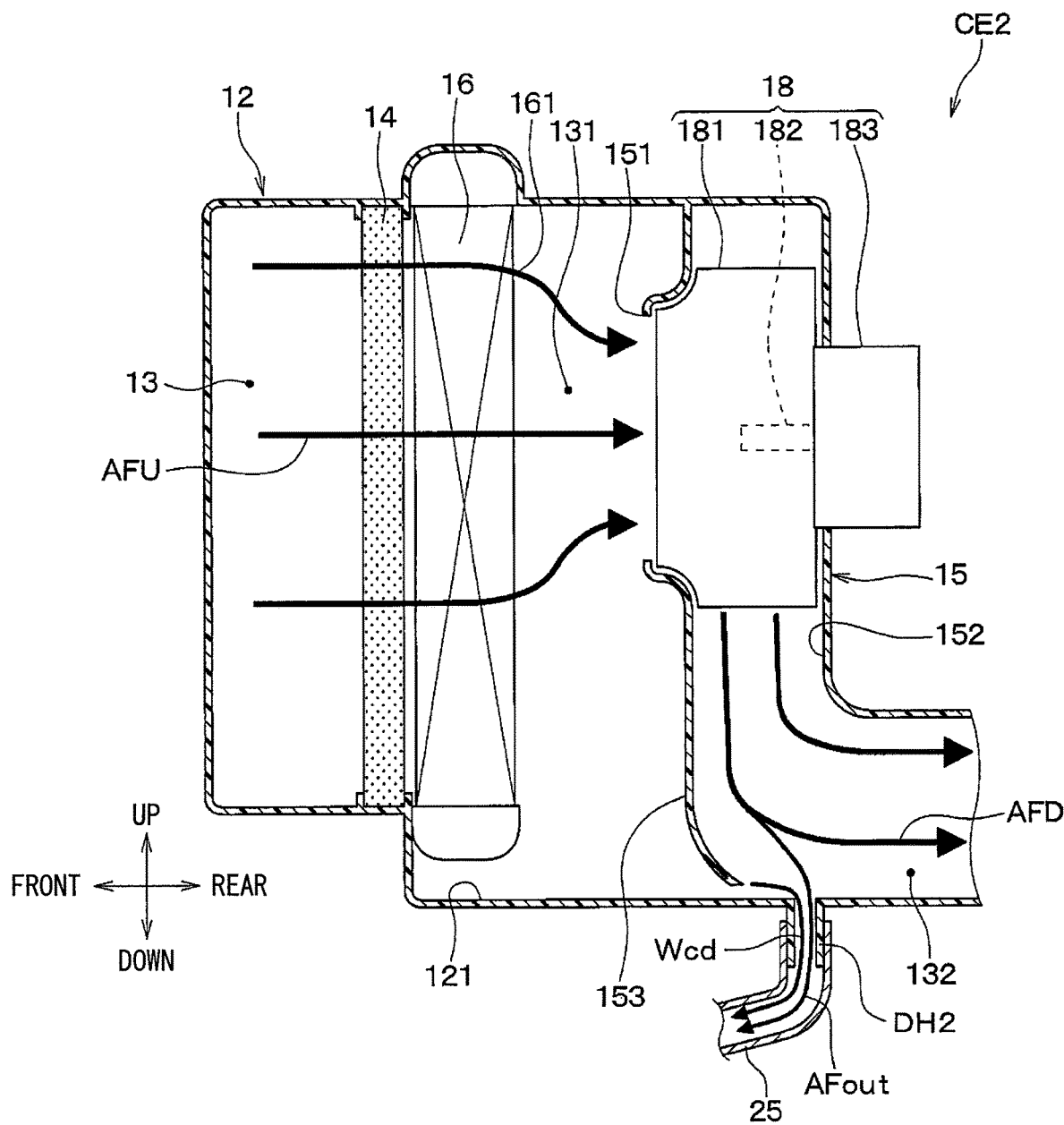
FIG. 7 is a cross-sectional view schematically illustrating a vehicular air conditioning unit according to a second comparative example.

To more clearly appreciate the above points, comparative examples for the vehicular air conditioning unit 10 of the present embodiment will be described with reference to FIGS. 6 and 7. FIG. 6 is a cross-sectional view schematically illustrating a vehicular air conditioning unit CE1 according to a first comparative example. Further, FIG. 7 is a cross-sectional view schematically illustrating a vehicular air conditioning unit CE2 according to a second comparative example. For convenience of explanation with respect to the vehicular air conditioning units CE1 and CE2 of the comparative example, in FIGS. 6 and 7, the same reference numerals are given to configurations which are the same as those of the vehicular air conditioning unit 10 of the present embodiment.

As shown in FIG. 6, the vehicular air conditioning unit CE1 of the first comparative example has a drainage portion DH1 formed in the lower wall surface 121 that forms the upstream side space 131 of the air conditioning case 12. Specifically, the drain portion DH1 is provided in a portion of the air conditioning case 12 located below the evaporator 16.

In the vehicular air conditioning unit CE1 of the first comparative example, as shown by the arrow Wcd in FIG. 6, the condensed water generated in the evaporator 16 drips onto the lower wall surface 121 forming the upstream side space 131, and is then drained to the outside of the passenger compartment through the drainage portion DH1 and the drain hose 25.

However, in the vehicular air conditioning unit CE1 of the first comparative example, the drainage portion DH1 is formed in the upstream side space 131 which has a lower pressure than outside of the air conditioning case 12. For this reason, as shown by the arrow AFin in FIG. 6, the air outside the air conditioning case 12 tends to enter into the air conditioning case 12 via the drainage portion DH1.

If the air outside the air conditioning case 12 flows into the air conditioning case 12 via the drainage portion DH1, abnormal noises may occur when draining water from the drainage portion DH1, or ventilation loss may increase due to sucking in air from outside the passenger compartment.

Next, as shown in FIG. 7, the vehicular air conditioning unit CE2 of the second comparative example has a drainage portion DH2 formed in the lower wall surface 121 that forms the downstream side space 132 of the air conditioning case 12. Specifically, the drain portion DH2 is provided in a portion of the air conditioning case 12 located below the fan 181.

In the vehicular air conditioning unit CE2 of the second comparative example, as shown by the arrow Wcd in FIG. 7, the condensed water generated in the evaporator 16 flows onto the lower wall surface 121 forming the downstream side space 132, and is then drained to the outside of the passenger compartment through the drainage portion DH2 and the drain hose 25.

However, in the vehicular air conditioning unit CE2 of the second comparative example, the drainage portion DH2 is formed in the downstream side space 132 which has a higher pressure than outside of the air conditioning case 12. For this reason, as indicated by the arrow AFout in FIG. 7, a part of the air blown out from the fan 181 tends to out of the air conditioning case 12 via the drainage part DH2. When a part of the air blown out from the fan 181 flows out of the air conditioning case 12 via the drainage portion DH2, ventilation loss increases due to the air cooled by the evaporator 16 flowing out of the air conditioning case 12.

In contrast to this, according to the vehicular air conditioning unit 10 of the present embodiment, the space forming portion 20 forms the drainage space 21 which is in communication with both the upstream side space 131 on the air flow upstream side of the blower 18 and the downstream side space 132 on the air flow downstream side of the blower 18. Further, according to the vehicular air conditioning unit 10 of the present embodiment, the drainage portion 24 is formed with respect to the space forming portion 20.

Due to this, the pressure in the space provided with the drainage portion 24 in the air conditioning case 12 is an intermediate pressure between the pressure in the upstream side space 131 and the pressure in the downstream side space 132. For this reason, according to the vehicular air conditioning unit 10 of the present embodiment, when compared to the vehicular air conditioning units CE1, CE2 of the comparative examples, the pressure difference between the pressure in the space provided with the drainage portion 24 in the air conditioning case 12 and the pressure in the space outside the air conditioning case 12 is reduced.

Therefore, according to the vehicular air conditioning unit 10 of the present embodiment, as compared with the vehicular air conditioning unit CE1 of the first comparative example, it is more difficult for air outside the air conditioning case 12 to flow into the upstream side space 131 of the air conditioning case 12 through the drainage portion 24. Therefore, according to the vehicular air conditioning unit 10 of the present embodiment, it is possible to suppress ventilation loss caused by the inflow of air from outside the air conditioning case 12 while suppressing the generation of abnormal noises during drainage.

Further, according to the vehicular air conditioning unit 10 of the present embodiment, as compared with the vehicular air conditioning unit CE2 of the second comparative example, it is more difficult for the air in the downstream side space 132 of the air conditioning case 12 to flow out of the air conditioning case 12 through the drainage portion 24. For this reason, according to the vehicular air conditioning unit 10 of the present embodiment, it is possible to suppress ventilation loss caused by outflow of air in the air conditioning case 12.

Further, according to the vehicular air conditioning unit 10 of the present embodiment, the upstream side communication portion 26 is formed at a position overlapping the first connection portion 231 of the partitioning portion 23 which is connected to the lower wall forming portion 22. Due to this, water dripping on the lower wall surface 121 in the upstream side space 131 of the air conditioning case 12 can easily flow from the upstream side communication portion 26 to the drainage portion 24. For this reason, in this configuration, it is possible to exhibit smooth drainage in the upstream side space 131 of the air conditioning case 12.

In addition, according to the vehicular air conditioning unit 10 of the present embodiment, the downstream side communication portion 27 is formed at a position overlapping the second connection portion 232 of the partitioning portion 23 which is connected to the lower wall forming portion 22. Due to this, water dripping on the lower wall surface 121 in the downstream side space 132 of the air conditioning case 12 can easily flow from the downstream side communication portion 27 to the drainage portion 24. For this reason, in this configuration, it is possible to exhibit smooth drainage in the downstream side space 132 of the air conditioning case 12.

Here, in the present embodiment, an example is described in which the condensed water generated in the evaporator 16 is discharged to outside the air conditioning case 12 via the drainage portion 24 and the like. However, the water discharged from the drainage portion 24 is not limited to condensed water. For example, rainwater or the like sometimes enters into the air conditioning case 12 from the outside air introduction portion or the like. According to the vehicular air conditioning unit 10 of the present embodiment, any water that enters from the outside air introducing portion or the like can also be discharged to outside of the air conditioning case 12 via the drainage portion 24 and the like, similar to condensed water.

Second Embodiment

Next, a second embodiment will be described with reference to FIGS. 8 and 9. In the present embodiment, a downstream side communication portion 27A is provided at a different location in the partitioning portion 23 as compared to the first embodiment.

Figure 8:
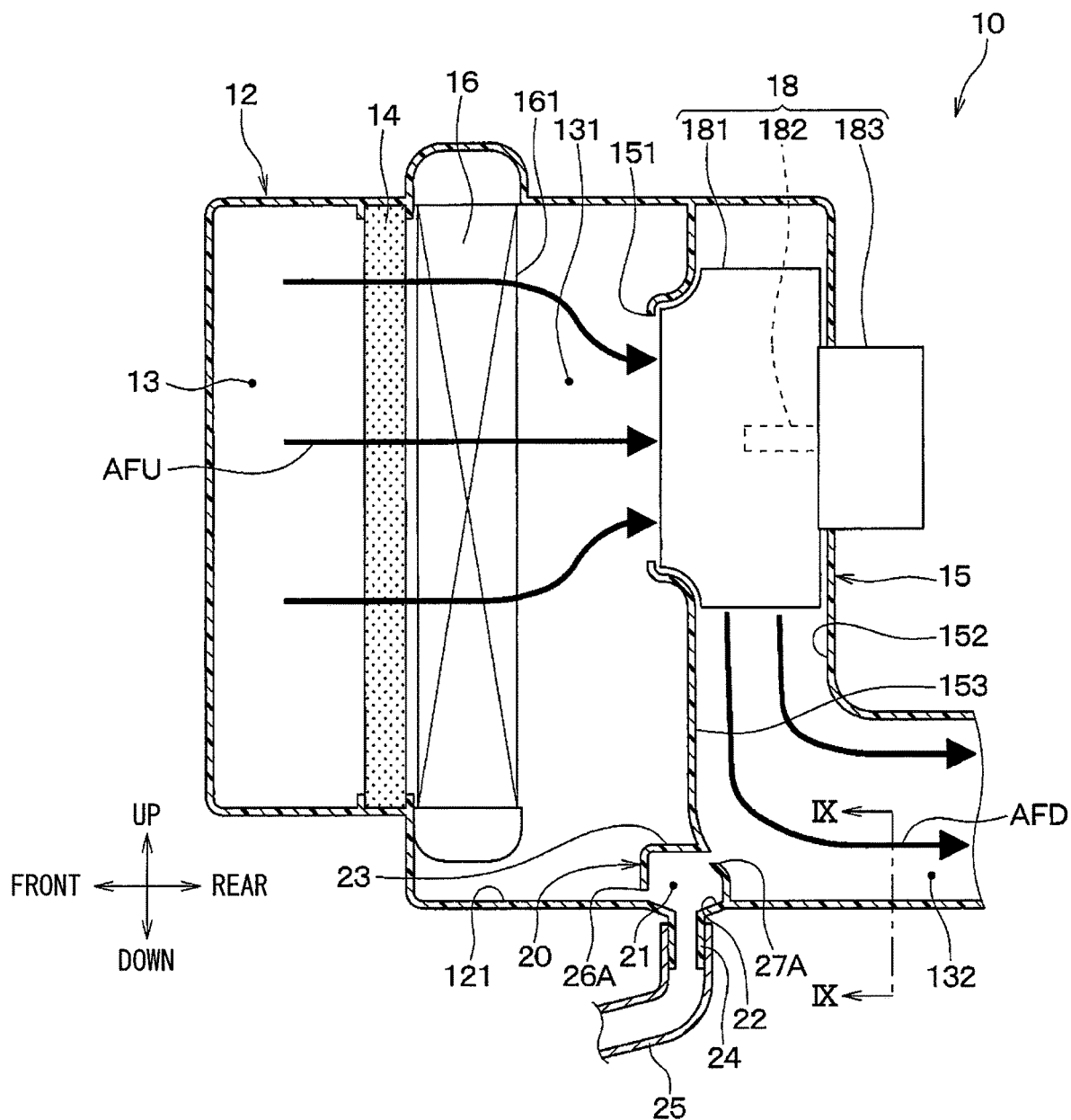
FIG. 8 is a cross-sectional view schematically illustrating a vehicular air conditioning unit.
Figure 9:
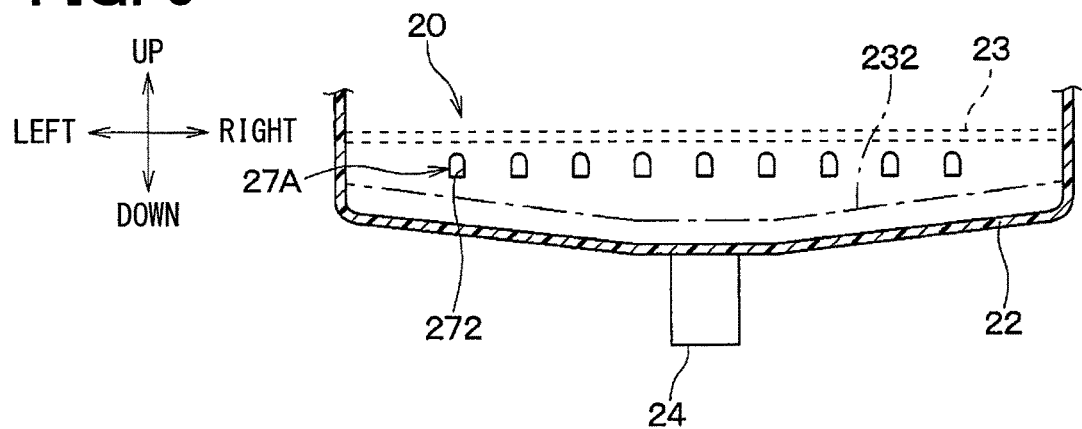
FIG. 9 is a cross-sectional view taken along line IX-IX in FIG. 8.

As shown in FIGS. 8 and 9, the downstream side communication portion 27A of the present embodiment is formed within the parts of the partitioning portion 23 facing the downstream side space 132. Specifically, the downstream side communication portion 27A of the present embodiment is located above the second connection portion 232 connected to the lower wall forming portion 22.

Specifically, the downstream side communication portion 27A of the present embodiment is a plurality of communication holes 272 formed in the partitioning portion 23 at positions separated upwards from to the lower wall forming portion 22. The plurality of communication holes 272 are formed by vertically elongated holes formed side by side along the left-right direction. It should be noted that the communication holes 272 may be horizontally elongated holes instead as well.

Further, the upstream side communication portion 26A of the present embodiment is formed within the parts of the partitioning portion 23 facing the upstream side space 131. Specifically, similar to the first embodiment, the upstream side communication portion 26A of the present embodiment is formed at a position overlapping the first connection portion 231 which is connected to the lower wall forming portion 22.

The remaining configurations are the same as those of the first embodiment. The vehicular air conditioning unit 10 of the present embodiment can exhibit the same operational effects as the first embodiment with respect to the configurations common with the first embodiment.

In particular, in the vehicular air conditioning unit 10 of the present embodiment, the downstream side communication portion 27A is formed within the parts of the partitioning portion 23 facing the downstream side space 132. Specifically, the downstream side communication portion 27A of the present embodiment is located above the second connection portion 232 connected to the lower wall forming portion 22. In this regard, by forming the downstream side communication portion 27A in the portion of the partitioning portion 23 located above the second connection portion 232 connected to the lower wall forming portion 22, it is possible to suppress water from dripping onto the lower wall surface 121 in the downstream side space 132 of the air conditioning case 12. Due to this, with the present configuration, for example, when electric parts, electronic parts, and the like are disposed on the air flow downstream side of the blower 18, it is possible to reduce water damage of the electric parts, the electronic parts, and the like.

Third Embodiment

Next, a third embodiment will be described with reference to FIGS. 10 to 12. In the present embodiment, shapes of an upstream side communication portion 26B and a downstream side communication portion 27B are different from those of the first embodiment.

Figure 10:
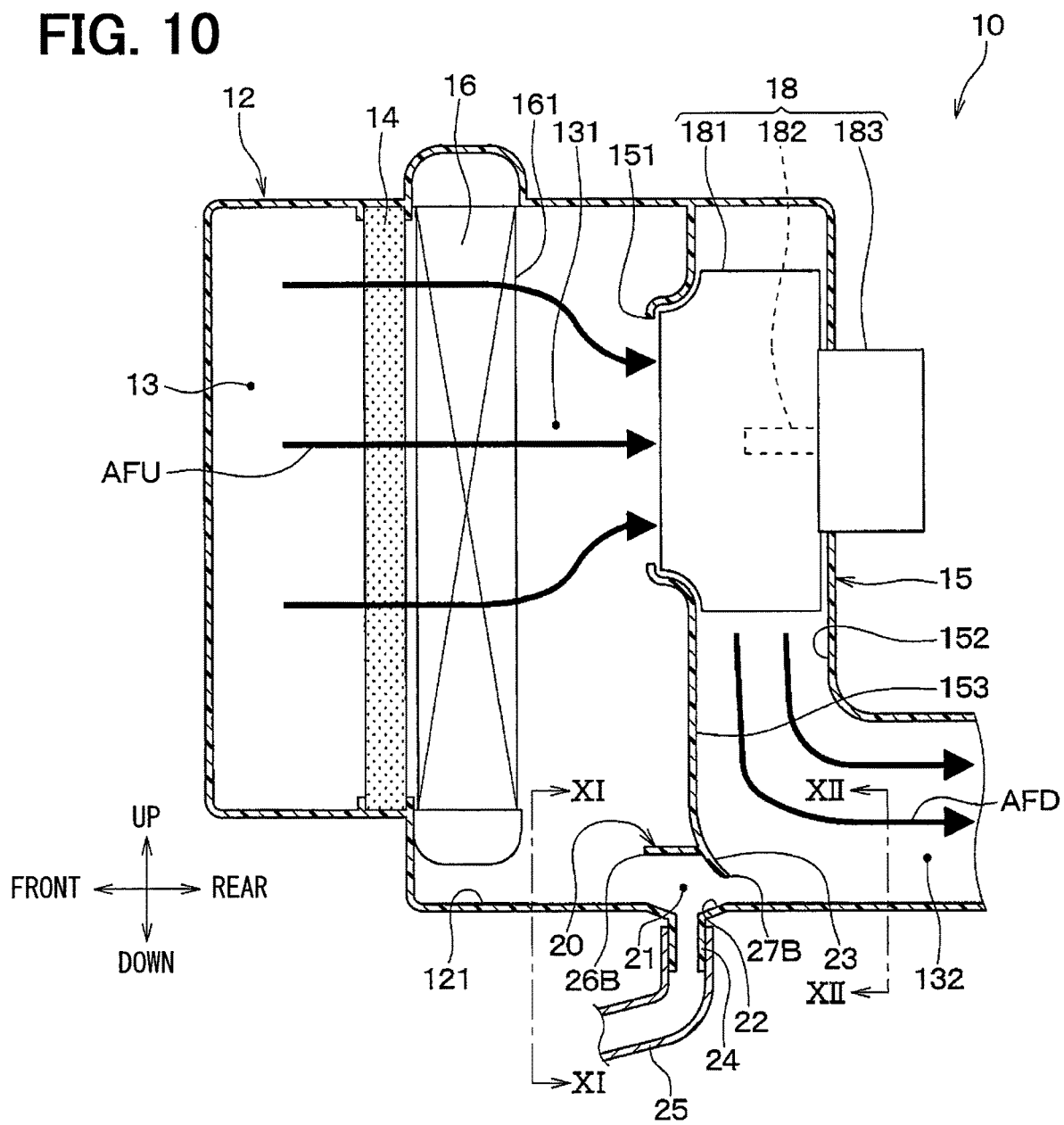
FIG. 10 is a cross-sectional view schematically illustrating a vehicular air conditioning unit.
Figure 11:
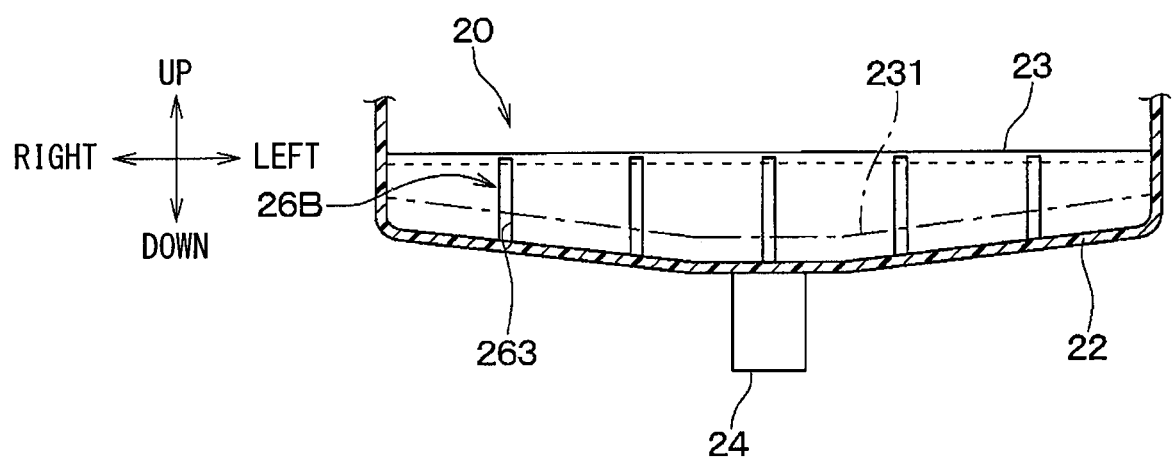
FIG. 11 is a cross-sectional view taken along line XI-XI in FIG. 10.

As shown in FIGS. 10 and 11, the upstream side communication portion 26B of the present embodiment is a plurality of slit-shaped communication holes 263 that intersect the wall face of the lower wall forming portion 22. Each of the plurality of communication holes 263 constituting the upstream side communication portion 26B extends upward from the first connection portion 231 connected to the lower wall forming portion 22 within the portions of the partitioning portion 23 that face the upstream side space 131.

Figure 12:
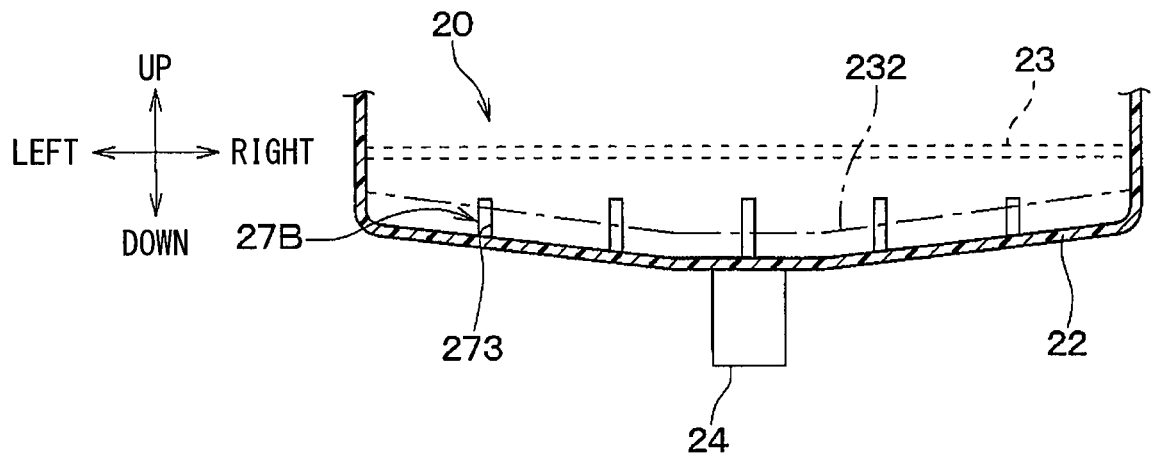
FIG. 12 is a cross-sectional view taken along line XII-XII in FIG. 10.

Further, as shown in FIGS. 10 and 12, the downstream side communication portion 27B of the present embodiment is a plurality of slit-shaped communication holes 273 that intersect the wall face of the lower wall forming portion 22. Each of the plurality of communication holes 273 constituting the downstream side communication portion 27B extends upward from the second connection portion 232 connected to the lower wall forming portion 22 within the portions of the partitioning portion 23 that face the downstream side space 132.

Here, if the portions of the air conditioning case 12 including the partitioning portion 23 are integrally formed by injection molding using upper and lower molds, there is a possibility that undercuts or the like may occur due to the plurality of communication holes 263, 273 constituting the upstream side communication portion 26B and the downstream side communication portion 27B.

For this reason, in the present embodiment, each of the plurality of communication holes 263, 273 constituting the upstream side communication portion 26B and the downstream side communication portion 27B is a slit-shaped hole that extends from each connection portion 231, 232 connected to the lower wall forming portion 22 in the partitioning portion 23 to an upper end portion. Due to this, according to the vehicular air conditioning unit 10 according to the present embodiment, it is possible to integrally mold the portions of the air conditioning case 12 including the partitioning portion 23 by injection molding using upper and lower molds.

The remaining configurations are the same as those of the first embodiment. The vehicular air conditioning unit 10 of the present embodiment can exhibit the same operational effects as the first embodiment with respect to the configurations common with the first embodiment.

In particular, according to the vehicular air conditioning unit 10 of the present embodiment, the upstream side communication portion 26B and the downstream side communication portion 27B are the plurality of slit-shaped communication holes 263, 273 which extend in a direction intersecting the wall surface of the lower wall forming portion 22.

In this regard, if both the upstream side communication portion 26B and the downstream side communication portion 27B are formed by the slit-shaped communication holes 263, 273 that intersect the wall surface of the lower wall forming portion 22, air is able to flow in the upper regions of the communication holes 263, 273 while water is able to flow in the lower regions of the communication holes 263, 273. In this regard, according to the structure in which the air flowing region and the water flowing region are respectively secured in the communication holes 263, 273, it is possible to reduce interference between the flow of water and the flow of air, so that generation of abnormal noises can be effectively reduced.

Here, regarding the present embodiment, an example is described in which both the upstream side communication portion 26B and the downstream side communication portion 27B are formed by the slit-shaped communication holes 263, 273 that intersect the wall surface of the lower wall forming portion 22, but this is not intended to be limiting. For example, in the vehicular air conditioning unit 10, one of the upstream side communication portion 26B or the downstream side communication portion 27B may be constituted by slit-shaped communication holes.

Other Embodiments

Although the representative embodiments of the present disclosure have been described above, the present disclosure should not be limited to the above-described embodiments. For example, various modifications can be made as follows.

In each of the above-described embodiments, an example is described in which the fan 181 of the blower 18 is a centrifugal fan. However, the fan 181 of the blower 18 is not limited to a centrifugal fan, and may be an axial flow fan or a cross flow fan as well.

In each of the above-described embodiments, an example is described in which the fan 181 of the blower 18 is disposed at a position facing the outflow surface 161 of the evaporator 16, but this is not limiting. The manner in which the evaporator 16 and the blower 18 are arranged can be appropriately modified according to the shape of the air conditioning case 12.

In each of the above-described embodiments, an example is described in which the evaporator 16 is disposed such that the thickness direction of the heat exchanging portion of the evaporator 16 coincides with the front-rear direction. However, this is not limiting. The evaporator 16 may be arranged such that the thickness direction of the heat exchanging portion is slightly inclined with respect to the front-rear direction.

In each of the above-described embodiments, an example is described in which the air is cooled by the evaporator 16 of the refrigeration cycle, but this is not limiting. The heat exchanger that cools the air is not limited to the evaporator 16, and may be, for example, a heat exchanger in which cool water flows.

In each of the above-described embodiments, an exemplary configuration is described in which in which the evaporator 16 is disposed in the upstream side space 131 of the air passage 13, but this is not limiting. In the vehicular air conditioning unit 10, for example, both the evaporator 16 and the heater core may be arranged in the upstream side space 131 of the air passage 13.

The constituent element(s) of each of the above embodiments is/are not necessarily essential unless it is specifically stated that the constituent element(s) is/are essential in the above embodiment, or unless the constituent element(s) is/are obviously essential in principle.

Furthermore, in each of the above embodiments, in the case where the number of the constituent element(s), the value, the amount, the range, and/or the like is specified, the present disclosure is not necessarily limited to the number of the constituent element(s), the value, the amount, and/or the like specified in the embodiment unless the number of the constituent element(s), the value, the amount, and/or the like is indicated as indispensable or is obviously indispensable in view of the principle of the present disclosure.

Furthermore, in each of the above embodiments, in the case where the shape of the constituent element(s) and/or the positional relationship of the constituent element(s) are specified, the present disclosure is not necessarily limited to the shape of the constituent element(s) and/or the positional relationship of the constituent element(s) unless the embodiment specifically states that the shape of the constituent element(s) and/or the positional relationship of the constituent element(s) is/are necessary or is/are obviously essential in principle.

CONCLUSION

According to a first aspect shown in some or all of the above embodiments, a vehicular air conditioning unit is provided with a space forming portion that forms a drainage space partitioned from an air passage in an air conditioning case. The space forming portion includes a drainage portion that discharges the water inside the air conditioning case to outside of the air conditioning case, and an upstream side communication portion that communicates the drainage space to an upstream side space on the air flow upstream side of a blower in the air passage. Further, the space forming portion includes a downstream side communication portion that communicates the drainage space to a downstream side space on the air flow downstream side of a blower in the air passage.

Further, according to a second aspect, the space forming portion of the vehicular air conditioning unit includes a lower wall forming portion that forms a part of a lower wall surface of the air conditioning case, and a partitioning portion that forms the drainage space between the partitioning portion and the lower wall forming section and that partitions the upstream side space from the downstream side space. The drainage portion is formed in the lower wall forming portion. Further, at least a part of the upstream side communication portion is formed at a position that overlaps with a connection portion connected to the lower wall forming portion among the portions of the partitioning portion facing the upstream side space.

In this regard, by forming the upstream side communication portion at a position overlapping with the connection portion connected to the lower wall forming portion in the partitioning portion, any water that drips onto the lower wall surface in the upstream side space of the air conditioning case is able to easily flow from the upstream side communication portion to the draining portion. For this reason, in this configuration, it is possible to exhibit smooth drainage in the upstream side space of the air conditioning case.

Further, according to a third aspect, in the vehicular air conditioning unit, at least a part of the downstream side communication portion is formed at a position that overlaps with the connection portion connected to the lower wall forming portion among the portions of the partitioning portion facing the downstream side space.

In this regard, by forming the downstream side communication portion at a position overlapping with the connection portion connected to the lower wall forming portion in the partitioning portion, any water that drips onto the lower wall surface in the downstream side space of the air conditioning case is able to easily flow from the downstream side communication portion to the draining portion. For this reason, in this configuration, it is possible to exhibit smooth drainage in the downstream side space of the air conditioning case.

Further, according to a fourth aspect, in the vehicular air conditioning unit, the downstream side communication portion is formed at a position above the connection portion connected to the lower wall forming portion among the portions of the partitioning portion facing the downstream side space.

In this regard, by forming the downstream side communication portion in the portion of the partitioning portion located above the connection portion connected to the lower wall forming portion, it is possible to suppress water from dripping onto the lower wall surface in the downstream side space of the air conditioning case. For this reason, with the present configuration, for example, when electric parts, electronic parts, and the like are disposed on the air flow downstream side of the blower, it is possible to reduce water damage of the electric parts, the electronic parts, and the like.

Further, according to a fifth aspect, in the vehicular air conditioning unit, at least one of the upstream side communication portion or the downstream side communication portion is constituted by a slit-shaped communication hole which intersects a wall surface of the lower wall forming portion.

In this regard, if one of the upstream side communication portion or the downstream side communication portion is formed by a slit-shaped communication hole that intersects the wall surface of the lower wall forming portion, air is able to flow in the upper region of that communication holes, while water is able to flow in the lower region of that communication hole. In this regard, since an air flowing region and a water flowing region are respectively secured in the communication hole, it is possible to reduce interference between the flow of water and the flow of air, so that generation of abnormal noises can be effectively reduced.

According to a sixth aspect, in the vehicular air conditioning unit, the heater exchanger is constituted by a cooling heat exchanger that cools ventilation air. Further, the cooling heat exchanger is disposed in the upstream side space. According to this, not only water that enters the air conditioning case from outside, but also any condensed water condensed by the cooling heat exchanger can be drained to outside of the air conditioning case via the drainage portion.

The invention claimed is:

1. A vehicular air conditioning unit for air conditioning a passenger compartment, comprising:
   an air conditioning case that forms an air passage for ventilation air toward the passenger compartment;
   a heat exchanger housed inside the air conditioning case, the heat exchanger exchanging heat between a fluid flowing therein and the ventilation air; and
   a blower disposed on an air flow downstream side of the heat exchanger, the blower generating an air flow that flows toward the passenger compartment, wherein
   the air conditioning case includes a space forming portion that forms a drainage space which is partitioned from the air passage,
   the space forming portion includes
      a drainage portion that discharges water from inside the air conditioning case to outside of the air conditioning case,
      an upstream side communication portion that communicates the drainage space to an upstream side space on an air flow upstream side of the blower in the air passage,
      a downstream side communication portion that communicates the drainage space to a downstream side space on the air flow downstream side of the blower in the air passage,
      a lower wall forming portion that forms a part of a lower wall surface of the air conditioning case, and
      a partitioning portion that forms the drainage space between the partitioning portion and the lower wall forming portion, and that partitions the upstream side space from the downstream side space,
   the drainage portion is formed in the lower wall forming portion, the downstream side communication portion is formed at a position above a connection portion connected to the lower wall forming portion among the portions of the partitioning portion facing the downstream side space, a most-downstream end of the downstream side communication portion toward the air flow downstream side is arranged on the air flow upstream side of a most-downstream end of the connection portion toward the air flow downstream side, and the connection portion is in a plate shape and is raised from a lower wall surface of the air passage.

2. The vehicular air conditioning unit of claim 1, wherein at least a part of the upstream side communication portion is formed at a position that overlaps with the connection portion.

3. The vehicular air conditioning unit of claim 1, wherein at least one of the upstream side communication portion or the downstream side communication portion includes a slit-shaped communication hole which intersects a wall surface of the lower wall forming portion.

4. The vehicular air conditioning unit of claim 1, wherein the heat exchanger is a cooling heat exchanger that cools the ventilation air, and the cooling heat exchanger is disposed in the upstream side space.

* * * * *